July 4, 1944.  H. O. HEM  2,353,033
AIRPLANE TESTING APPARATUS
Filed Sept. 6, 1941  8 Sheets-Sheet 5
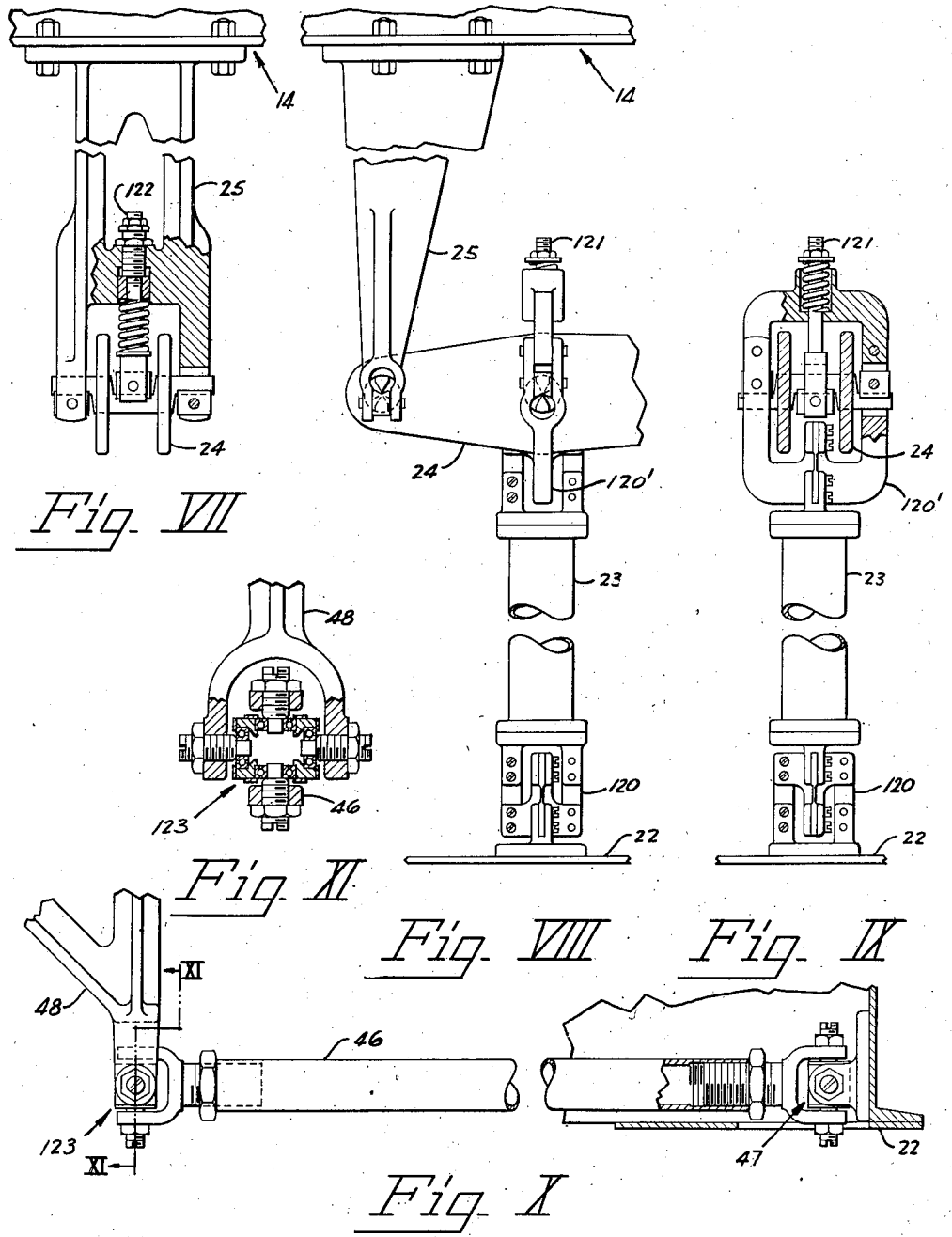
HALVOR O. HEM
INVENTOR
BY Marshall & Marshall
ATTORNEYS

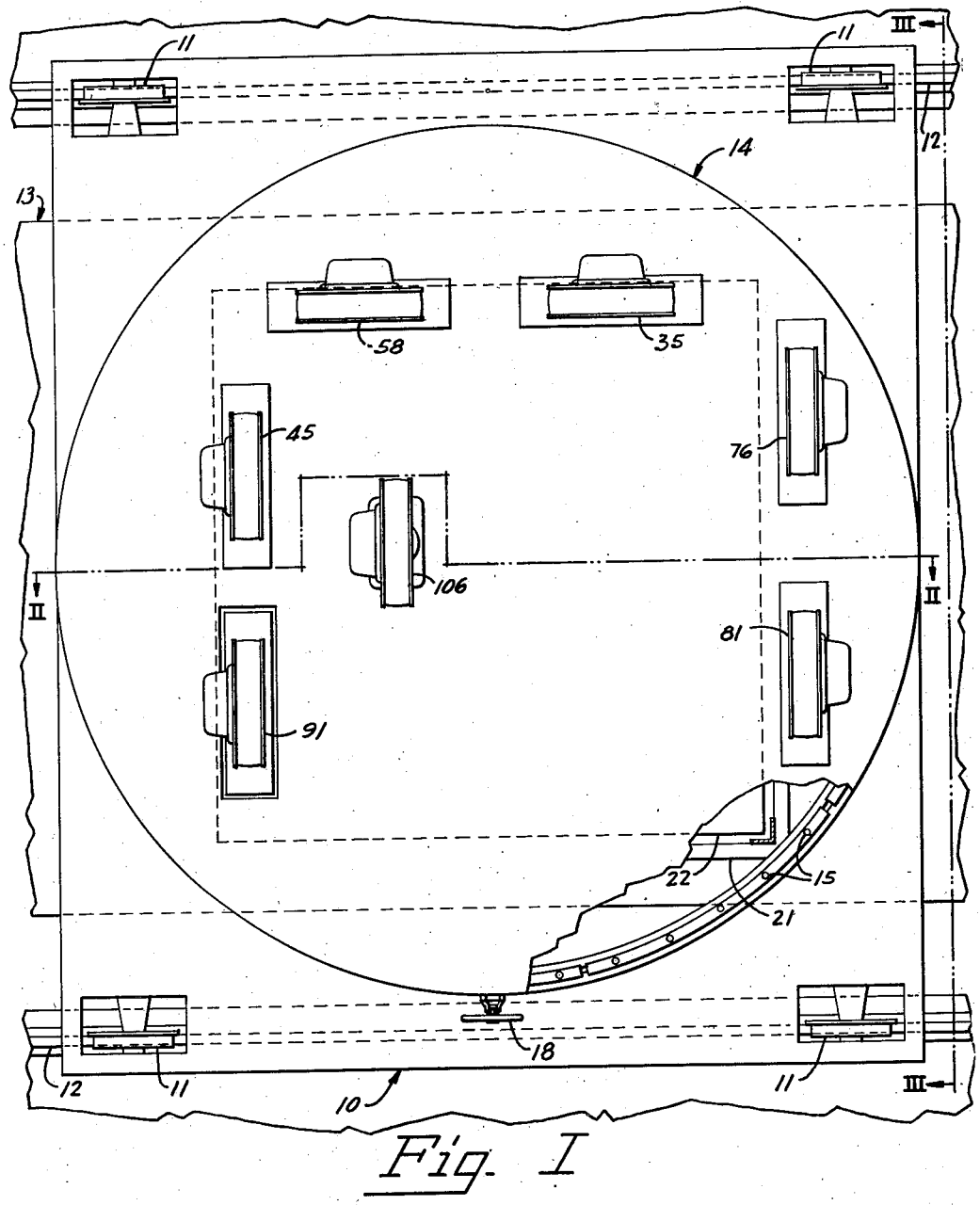

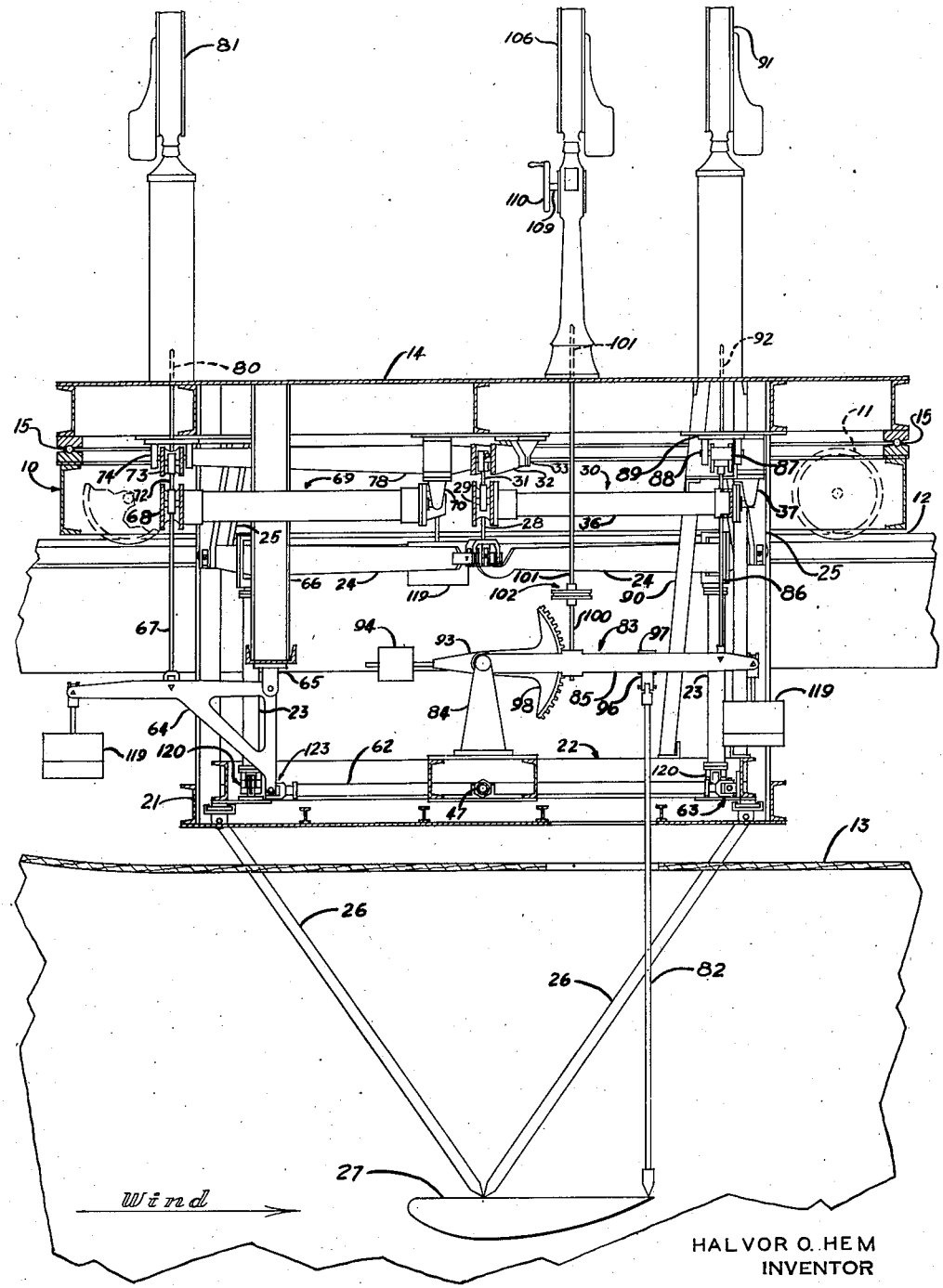

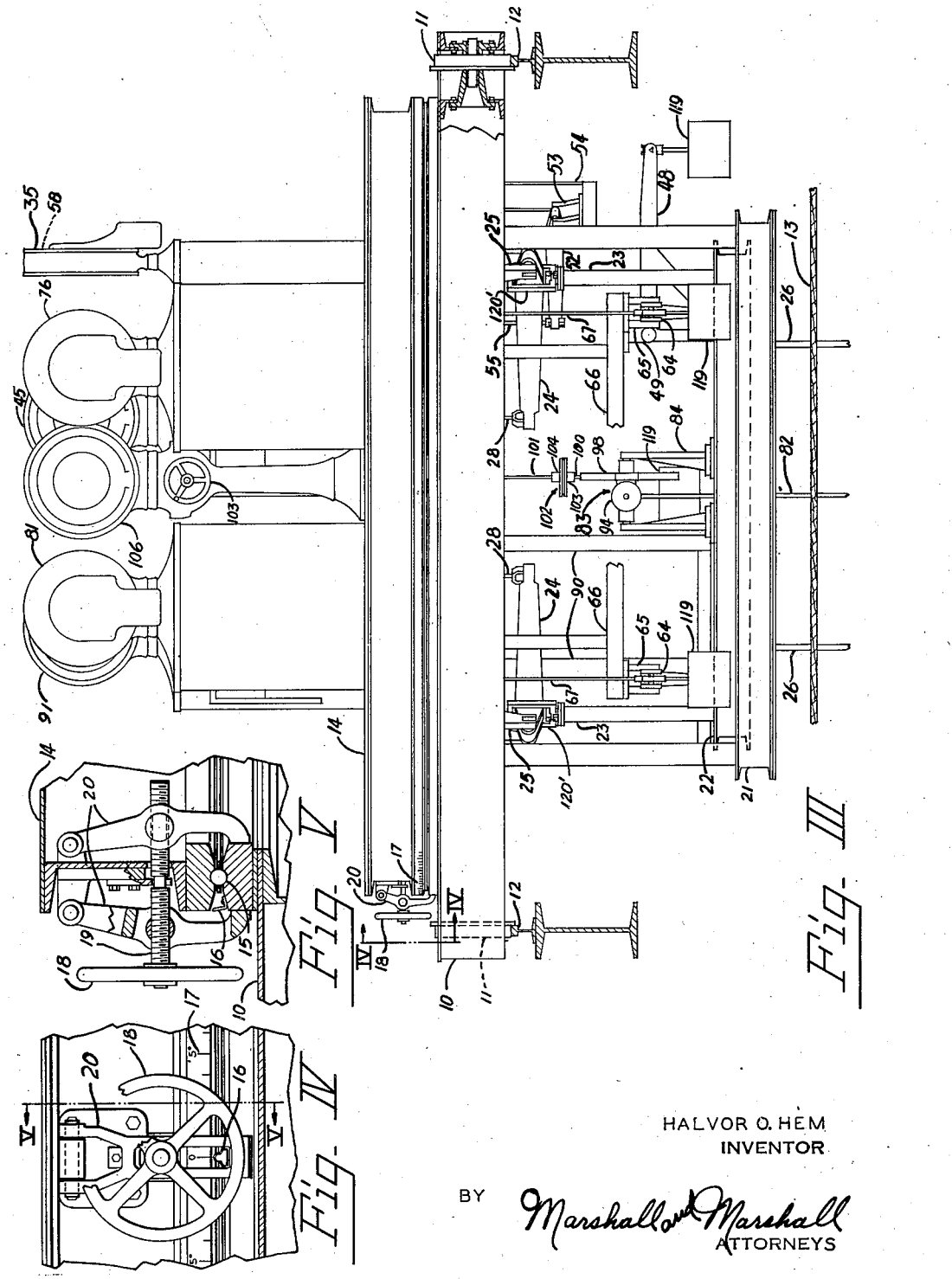

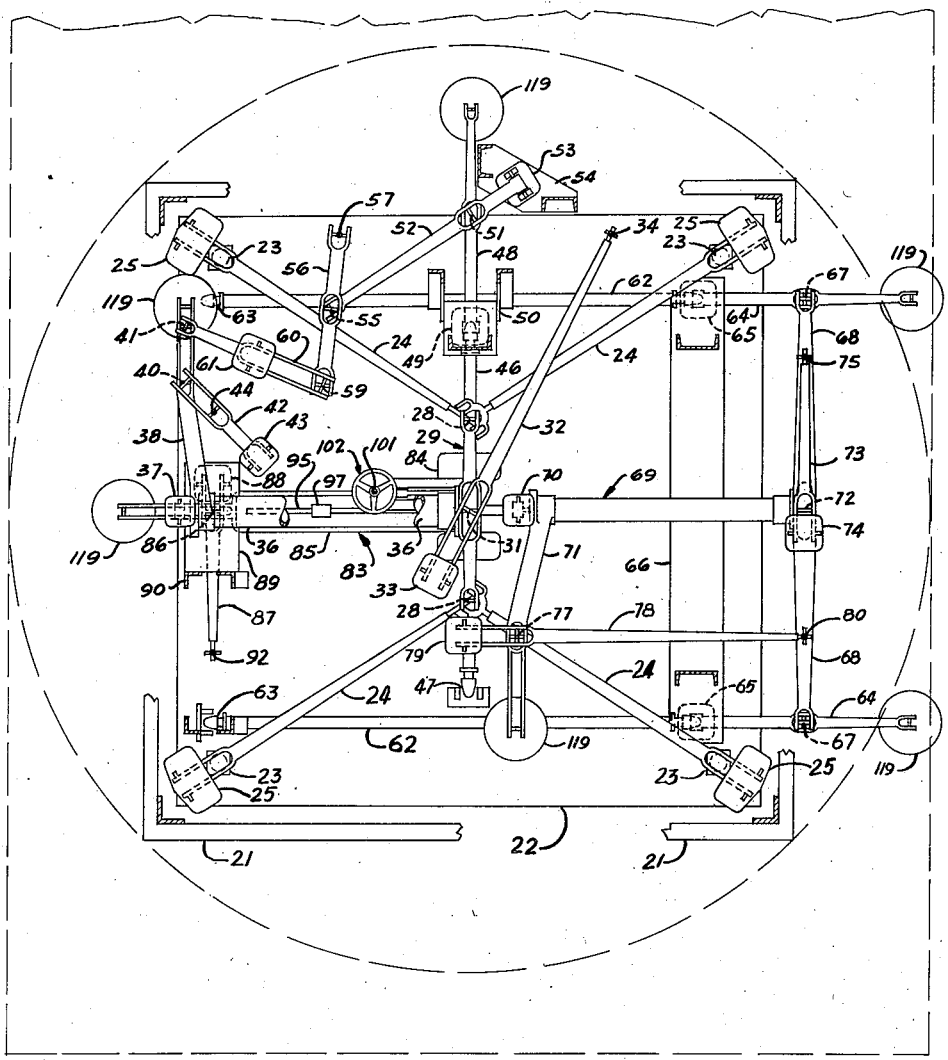
Fig. VI

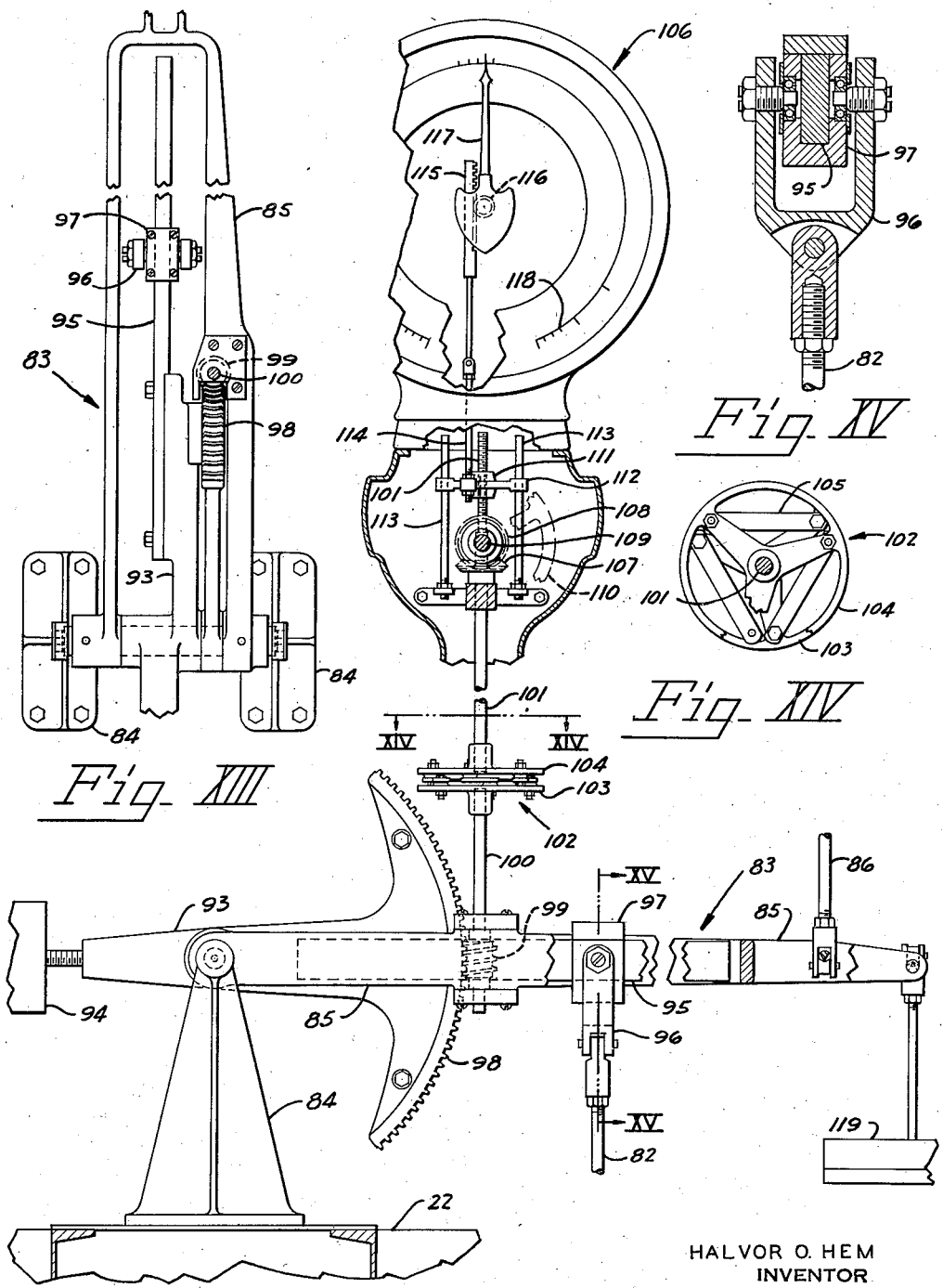

July 4, 1944.   H. O. HEM   2,353,033
AIRPLANE TESTING APPARATUS
Filed Sept. 6, 1941   8 Sheets-Sheet 7
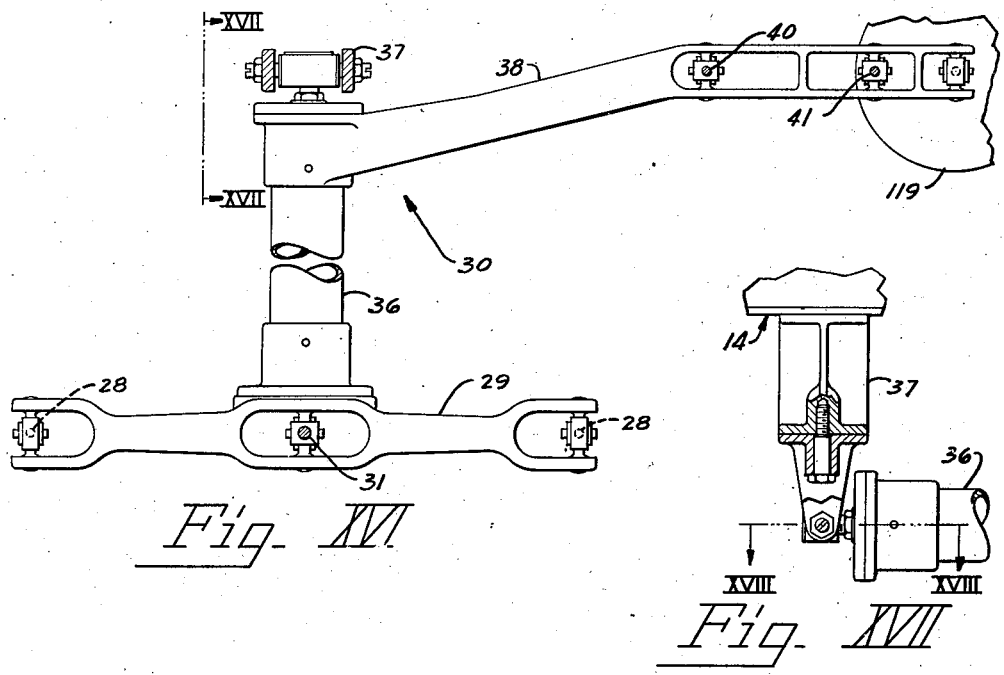
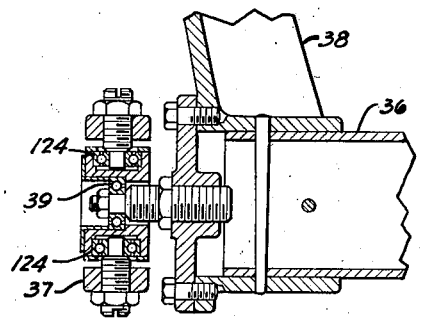
HALVOR O. HEM
INVENTOR
BY *Marshall and Marshall*
ATTORNEYS

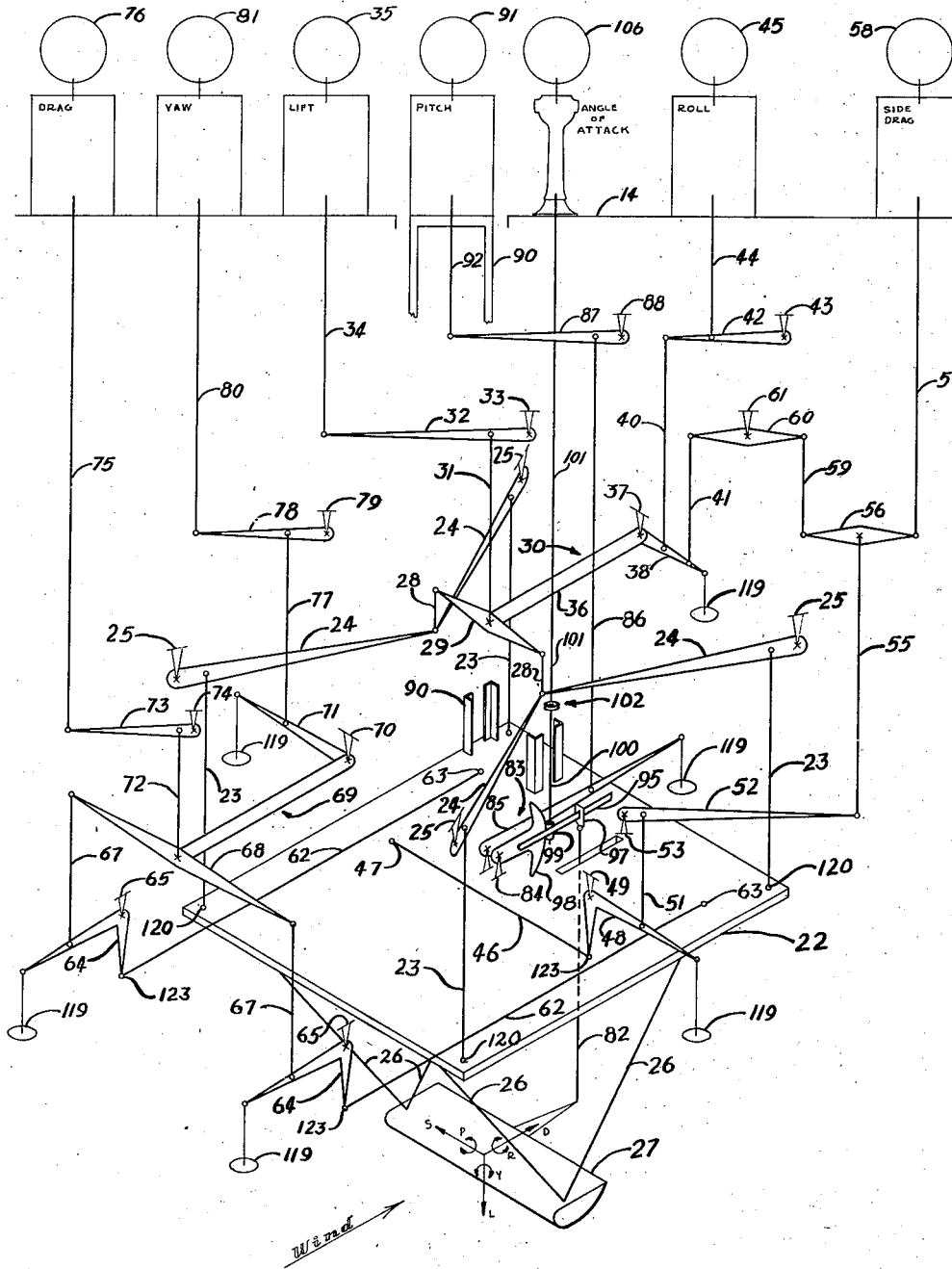

Patented July 4, 1944

2,353,033

UNITED STATES PATENT OFFICE 2,353,033

AIRPLANE TESTING APPARATUS

Halvor O. Hem, Toledo, Ohio, assignor to Toledo Scale Company, Toledo, Ohio, a corporation of New Jersey Application September 6, 1941, Serial No. 409,823

12 Claims. (Cl. 265—1)

This invention relates to testing apparatus, and more particularly to testing apparatus for use in wind tunnels for the registration of the values of individual components of the total forces acting upon bodies moving through the air at high speeds.

In the manufacture of aircraft it is essential that, during the design of the aircraft, tests be made to prove and develop the shapes and forms of the various parts of the aircraft with regard to the amount of resistance, drag or lift which those bodies create while passing through air at a high speed. Since it is impossible, of course, to measure such forces under actual flying conditions, wind tunnels have been developed for simulating flight conditions. In a wind tunnel, a model, or a full-sized aircraft is subjected to a current of air moving at speeds corresponding to those at which the aircraft will move through the air under actual flying conditions.

Various methods of registering the forces on the aircraft, and those exerted by the aircraft have been developed. The difficulty in such registering systems has been the fact that the total force exerted on or by an aircraft is the resultant of various component forces. These component forces are revolution on the three principal axes of the aircraft, that is "roll" on its longitudinal axis, "yaw" on its vertical axis and "pitch" on its transverse axis, and movement in the three directions, that is "drag," "side drag" and "lift." These six component forces vary when the air stream passes the aircraft at various angles to its normal direction of flight through the air. For this reason, it is necessary to provide means for adjusting the angular relation of the aircraft to the direction of the air stream both horizontally and vertically. The moment forces introduced by horizontal and vertical variation between the longitudinal axis of the aircraft and its direction of movement through the air must be such as to tend to return the aircraft to normal flight position. If the forces so introduced tend to increase the variations producing them, the aircraft is unstable and cannot be flown. If the forces are very strong in attempting to restore the normal flight position, the aircraft is difficult to maneuver. To arrive at a good design it is necessary to accurately measure these forces for various departures from the normal flight position.

Weighing scales connected to the aircraft have been used to record the values of these forces; however, certain of these component forces coact to give resultants in the three directions of movement. For example, the "lift" of an aircraft, its "roll" and its "side drag" may all interact, tending to lift the whole aircraft, to lift one side of it or to shift it sideways about its longitudinal axis, which is similar to the "roll." It has therefore been necessary to measure such resultant forces and then mathematically to break down the resultant into its various components so these individual forces could be isolated and studied. A similar difficulty is encountered in isolating the resultant of the two component forces of "drag" and "yaw."

Further problems are encountered in measuring these forces, because they may act both positively and negatively, which usually requires additional mathematical computation and may give incorrect net resultants rather than plus and minus components.

It is an object of this invention to provide testing apparatus which will register the values of all of the component forces contributing to the performance of an aircraft in flight.

It is another object of this invention to provide a wind tunnel testing device which will simulate accurate flight conditions, permit variation in direction of flight with respect to the stream of air, permit variation in the "angle of attack" of the aircraft and indicate the individual component forces contributing to the resultant movement of the aircraft.

And it is another object of this invention to provide a system of weighing scales and levers capable of registering both positive and negative forces and of resolving resultant forces into their various component forces.

It is a further object of this invention to provide a self-contained aircraft supporting device for use in a wind tunnel which will permit the simulation of flight conditions and the testing of such aircraft under such conditions.

It is a further object of this invention to provide a lever system for such a device which will distinguish between the component forces contributing to a resultant force and to segregate such component forces so that each of them may be indicated and studied separately.

More specific objects and advantages are apparent from the description, in which reference is had to the accompanying drawings illustrating a preferred form of scale embodying the invention.

In the drawings:

Fig. I is a plan view of a wind tunnel testing carriage embodying the invention, parts being broken away.

Fig. II is a vertical, sectional view of the device illustrated in Fig. I, taken on the line II—II of Fig. I.

Fig. III is a view in elevation, taken on the line III—III of Fig. I.

Fig. IV is a fragmentary view in elevation on a larger scale, taken on the line IV—IV of Fig. III.

Fig. V is a vertical sectional view, taken on the line V—V of Fig. IV.

Fig. VI is a plan view of the device shown in Fig. I with the weighing scale heads and the turntable platform removed.

Fig. VII is a fragmentary view, partly in section and on an enlarged scale, of the fulcrum support of one of the main "lift" levers.

Fig. VIII is a fragmentary view in elevation of the fulcrum bracket shown in Fig. VII and of the lever and load support rod associated therewith.

Fig. IX is a view of the mechanism shown in Fig. VIII, taken from the right side of Fig. VIII, parts being shown in section.

Fig. X is a fragmentary view of one of the tie rods and bell cranks of one of the horizontal movement lever systems, parts being shown in section.

Fig. XI is a view partly in section, taken on the line XI—XI of Fig. X.

Fig. XII is a fragmentary view of the mechanism for shifting the "angle of attack" of the aircraft and of the main lever of the "pitch" registering lever system, parts being shown in section.

Fig. XIII is a fragmentary plan view of a portion of the mechanism shown in Fig. XII.

Fig. XIV is a plan view with parts broken away and parts shown in section, taken from the direction indicated by the line XIV—XIV of Fig. XII.

Fig. XV is a view in vertical section, taken on the line XV—XV of Fig. XII.

Fig. XVI is a fragmentary plan view of a "lift," "roll" and "side-drag" resolving lever, forming a part of the mechanism.

Fig. XVII is a fragmentary view, taken on the line XVII—XVII of Fig. XVI.

Fig. XVIII is a sectional view on a still further enlarged scale, taken on the line XVIII—XVIII of Fig. XVII.

Fig. XIX is a diagrammatic drawing of the lever systems, floating platform and weighing scale heads of a device embodying the invention.

These specific drawings and the specific description that follows merely disclose and illustrate the invention and are not intended to impose limitations upon the claims.

A carriage 10, supported on wheels 11, is movable along rails 12 located on each side of and above the tube-like structure of a wind tunnel 13. The carriage 10 spans the wind tunnel 13, and serves as a crane to carry and to move such aircrafts as is being tested into and along the wind tunnel.

A turntable 14 is mounted on the carriage 10 and can be revolved on a horizontal plane with respect to the carriage 10 and the axis of the wind tunnel 13. The turntable 14 has mounted thereon a weighing scale head for each of the component forces which it is desirable to measure. These are arranged, as shown in Fig. I, for viewing by the operator who is stationed on the turntable 14. The turntable 14 (Figures III, IV and V) rotates on the carriage 10 on bearings 15 which are located between the lower bearing surface of the turntable 14 and the upper bearing surface of the carriage 10. An indicator 16, mounted on the carriage 10, cooperates with a series of indicia 17, which are marked in degrees and located on the periphery of the turntable 14, to indicate the angular relationship between the turntable 14 and the carriage 10 or the horizontal angular relationship between the aircraft being tested and the wind direction. A handwheel 18 turns a screw 19 which operates two clamping members 20 for locking the turntable 14 in place after it has been angularly rotated with respect to the carriage 10.

A lower turntable frame 21 (Figures II and III) is dependingly supported from the turntable 14. The turntable 14 and the lower turntable frame 21 and their supporting beams form a "basket" within which the mechanism of the scale is suspended.

A live deck 22 (Figures III, VI and XIX) is supported by support rods 23 (see also Figures VIII and IX) which are hung on the load pivots of main "lift" levers 24. There are four of the support rods 23, one located at each corner of the live deck 22 and four of the main "lift" levers 24, one of which supports each of the support rods 23. The levers 24 are fulcrumed in brackets 25 which are solidly fastened to the underside of the turntable 14.

The live deck 22 serves as the load receiver or platform of the scale as a whole. Four arms 26 are attached to the undersurface of the deck 22 and extend downwardly therefrom into the interior of the tunnel 13 where they support the model or aircraft, in this case the wing 27. For ease of mounting and control of the wing 27, it is supported on the arms 26 in an inverted position and pivotally connected thereto so that it can be rotated about its transverse axis (with respect to the direction of the wind which is indicated by the arrow in Fig. II). Thus the "lift" exerted by the wing actually exerts a downward rather than an upward force on the live deck 22.

The four main "lift" levers 24 extend inwardly toward the center of the live deck 22 and are connected in pairs at their nose ends by tie rods 28 to the ends of an even-arm gathering lever 29 (see also Fig. XVI) which is a portion of a "lift," "roll" and "side-drag" resolving lever 30. The center of the lever 29 is connected, by means of a tie rod 31, to the load pivot of a "lift" extension lever 32 which is fulcrumed in a bracket 33 attached to the undersurface of the turntable 14. The nose end of the lever 32 is connected through a pull rod 34 to the load-counterbalancing mechanism of a "lift" registering scale 35 which is mounted on the turntable 14. Thus the lifting force of the wing 27 (indicated by the arrow "L," Fig. XIX) exerts a downward pull on the arms 26, the live deck 22 and the support rods 23 which is transmitted by the levers 24, gathered by the lever 29, transmitted by the lever 32 and registered on the scale 35 connected thereto.

However, "roll" of the wing 27 (indicated by the arrow "R," Fig. XIX) pulls down one side of the wing 27 and raises the other. This exerts a greater force on one pair of the levers 24 than it does on the other pair, but does not affect the total force exerted by all four of the levers 24. The resolving lever 30 (Figures XVI and XIX) is, therefore, pivoted to turn on the axis of its pipe-like body 36. The body 36 extends horizontally and is pivoted in a bracket 37 which is attached to the undersurface of the turntable 14. A lever arm 38 is pinned on the end of the body 36 nearest the bracket 37 and extends horizontally forming a bell crank which rotates with the body 36 in a bearing 39 (Fig. XVIII) held in the bracket 37. The lever arm 38 has a tie rod 40 pivotally connected near its fulcrum in the bracket 37, and a second tie rod 41 similarly connected at a further distance from its fulcrum point. The upper end of the tie rod 40 is connected to a "roll" extension lever 42 which is fulcrumed in a bracket 43 fastened to the underside of the turntable 14. A pull rod 44 is pivotally connected to the lever 42, between its connection with the tie rod 40 and its fulcrum, and extends upwardly where it is connected to a "roll" registering scale 45.

When the wing 27 rotates about its fore and aft axis, one side of the wing is moved downward and the other side upward. This exerts a greater force on one of the pairs of lift levers 24 and a greater force on one end of the gathering lever 29, which rotates the resolving lever 30 and swings the lever arm 38 which, through its connections with the "roll" registering scale, indicates on that scale the force tending to "roll" the wing.

Thus the operation of the resolving lever 30 separates the rolling force from the resultant force of "lift" and "roll," permitting this force to be independently registered.

A horizontal "side-drag" anchor rod 46 (Figures X and XIX) is fastened in a universal joint 47 to one side of the live deck 22. The other end of the anchor rod 46 is universally connected to the lower end of a bell crank 48, which is pivoted in a bracket 49 fastened to a subframe 50 (Fig. VI) extending downwardly from the underside of the turntable 14. A tie rod 51 is pivotally attached to the horizontal arm of the bell crank 48 and extends upwardly to the load pivot of a "side-drag" lever 52, which is fulcrumed in a stand 53 mounted on a shelf 54 suspended from the turntable 14. The nose end of the lever 52 is connected, by means of a tie rod 55, to the center of an even-armed yoke 56. One arm of the yoke 56 is connected, through a pull rod 57, to the mechanism of a "side-drag" registering scale 58 which is mounted on the turntable 14. A tie rod 59 connects the other arm of the yoke 56 to one end of an even-armed lever 60 which is fulcrumed on a bracket 61 attached to the underside of the turntable 14. The other arm of the even-armed lever 60 is connected to the upper end of the tie rod 41 extending upwardly from the lever arm 38 of the "lift," "roll," "side-drag" resolving lever 30.

Side drag on the wing 27 (indicated by the arrow "S," Fig. XIX) not only tends to move the live deck 22 to the side but also, since the wing 27 is suspended below the plane of the live deck 22, tends to tilt the live deck 22 about its horizontal axis parallel to the fore and aft axis of the wing about which the wing "rolls." This pulls on the anchor rod 46, rotating the bell crank 48 about its fulcrum, and through the lever 52, exerting force on the yoke 56. One arm of the yoke 56 is connected directly to the "side-drag" registering scale 58, and the other arm of the yoke 56 is connected to the even-armed lever 60. Downward pull on the yoke 56 thus is resolved into an upward pull through the tie rod 41 on the lever arm 38. This deducts from the deck tilting force the amount of force which actually was caused by "side drag" rather than by "roll" and splits out these components so that they may be individually registered.

A pair of horizontally disposed anchor rods 62 extending perpendicularly to the anchor rod 46 are fastened to the live deck 22 with universal fastenings 63, similar to the way that the anchor rod 46 is fastened. The turntable 14 is ordinarily positioned so that it is parallel to the direction of flow of the air past the wing 27. These anchor rods are in turn connected to the vertical arms of substantially identical bell cranks 64 which are pivoted in brackets 65 fastened to the underside of a framework 66 (Figures II, III and VI) attached to the turntable 14. The horizontal arms of the bell cranks 64 are attached, by means of tie rods 67, to an even-armed lever 68 forming a portion of a "drag" and "yaw" resolving lever 69. The resolving lever 69 is constructed similarly to the resolving lever 30, its pipe-like body extending horizontally, being pivoted in a bracket 70 fastened to the turntable 14 and having a lever arm 71 extending at right angles forming a bell crank on the pipe-like body. The center of the even-armed lever 68 is connected, by means of a tie rod 72, to the load pivot of a "drag" lever 73 which is fulcrumed in a bracket 74 attached to the turntable 14. A pull rod 75 extends upwardly from the nose of the lever 73 to the mechanism of a "drag" registering scale 76. The lever arm 71 is connected, through a tie rod 77, to a "yaw" lever 78 pivoted in a bracket 79 attached to the underside of the turntable 14. The "yaw" lever 78 is connected, by a pull rod 80, to the mechanism of a "yaw" registering scale 81.

The resistance, or "drag" of the wing 27 (indicated by the arrow "D," Fig. XIX) against the passage of the air through the tunnel pulls on the live deck 22 and through the anchor rods 62, the bell cranks 64 and the tie rods 67, on the lever 68. The total pull on the lever 68 exerts a force on the tie rod 72, the lever 73 and the pull rod 75 which is connected to the "drag" registering scale 76. "Yaw" is the rotation of the wing 27 around its vertical axis (as shown by the arrow "Y," Fig. XIX). When this force exists it results in a greater pull being exerted on one of the anchor rods 62, bell cranks 64 and tie rods 67 connected thereto, which tips the lever 68 revolving the body of the resolving lever 69 on its axis and swinging the lever arm 71 which, through the tie rod 77, lever 78 and tie rod 80, exerts a force on the "yaw" registering scale 81.

"Pitch" of the wing 27 is its revolution (indicated by the arrow "P" in Fig. XIX) about its horizontal axis which extends at right angles to the direction of the air flow. The wing 27 (Fig. II) is pivotally connected to the arms 26 to permit this "pitching" movement. A tie rod 82 is attached to the trailing edge of the wing 27 and extends upwardly, through a slot-like opening in the live deck 22. A "pitch" lever 83 (Figures XII, XIII and XIX) is fulcrumed in a stand 84 fastened to the live deck 22. The "pitch" lever 83 includes an open frame 85, which is pivotally mounted in the stand 84. The nose end of the lever frame 85 has pivotally mounted therein an upwardly extending tie rod 86, which is pivoted on the load pivot of a "pitch" extension lever 87, fulcrumed in a bracket 88, mounted on a subframe 89, which forms a part of a supporting stand 90 fastened above the live deck 22. The supporting stand 90 extends upwardly to the level of the turntable 14 and supports the head of a "pitch" indicating scale 91. The nose of the lever 87 is connected to the mechanism of the scale 91 by means of a pull rod 92.

The "pitch" indicating scale 91 is mounted on the stand 90 supported on the live deck 22, rather than on the turntable 14 as the other scales of the system are mounted. "Pitching" force of the wing 27, and, even more so, of an aircraft mounted for testing in the device, is a component force contributing to the total "lift" of the wing. If the scale 91 were mounted on the turntable 14, all such "pitching" force would be counterbalanced therein and that part of the "lift" resulting therefrom would not be registered as "lift." By mounting the scale 91 directly on the deck 22, the "pitching" moment or force is registered thereon and also, as a contributing factor to the movement of the deck 22, on the "lift" indicating scale 35. This is even more important with respect to a complete airplane because the tail surfaces have an airfoil (lifting) section and exert a definite "lift." "Lift" in the tail surfaces, because of the pivotal mounting of the airplane, would be entirely registered as "pitch" if the "pitch" scale 91 were fixedly mounted. By mounting the scale 91 on the floating live deck 22, the "pitch" is separately registered and the total "lift," including that portion thereof resulting from the lifting force of the tail surfaces, is registered as such.

An arm 93 (Figure XIII) is pivoted in the stand 84, on the same axis as the open frame 85, and extends horizontally from the pivot between the sides of the frame 85 and also in the opposite direction where it has a threaded section on which is located a counterbalancing weight 94. The arm 93 has a bar 95 securely fastened to that portion extending between the sides of the frame 85 on which is pivotally and slidingly attached a yoke 96 (Figures XIII and XV) fastened on the upper end of the tie rod 82. The yoke 96 is pivoted in ball bearings in a slide 97 which is movable along the bar 95. This sliding connection is provided to accommodate aircraft or models having different sized wings since the tie rod 82 should be attached to the wing at or near its trailing edge. A sector worm gear 98 is also pivoted on the same axis as the arm 93 to which it is attached and is in mesh with a vertically disposed worm 99 journaled in the frame 85 of the lever 83. The worm 99 is attached to the lower end of a vertical shaft 100 which extends upwardly from the lever 83. The upper end of the shaft 100 is connected to the lower end of a shaft 101 through a universal connection 102 (Figures XII and XIV). The universal connection 102 consists of two opposing wheels 103 and 104 pinned on the ends of the shafts 100 and 101 respectively. The two wheels 103 and 104 are drivingly connected by flexible links 105 which permit a slight misalignment between the axes of the shafts 100 and 101 and yet insure a driving connection between these two shafts. The shaft 101 extends upwardly through the turntable 14 and into the interior of an "angle of attack" indicator housing 106.

A bevel gear 107, pinned on the shaft 101 near its upper end, is in mesh with a second bevel gear 108, which is pinned on the inner end of a horizontal shaft 109 extending outside the housing 106 and having attached to its outermost end a handwheel 110. The upper end of the shaft 101 is threaded and extends through a nut 111, which is a portion of a sliding bracket 112 mounted on vertical slide rods 113 located within the housing 106. A link 114 is attached at its lower end to the bracket 112 and has attached to its upper end a rack 115, which is in mesh with a pinion 116 pinned on the shaft of an indicator 117. The indicator 117 cooperates with a series of indicia 118 to indicate the degree of the "angle of attack."

Revolution of the handwheel 110 rotates the shafts 101 and 100 and the worm 99 which raises or lowers the sector worm gear 98, angularly displacing the arm 93, bar 95 and weight 94 with relation to the open frame 85 of the lever 83. This either raises or lowers the tie rod 82 which is connected to the trailing edge of the wing 27 and thus turns the wing on its transverse axis to vary its "angle of attack." However, since the arm 93 is moved with relation to the frame 85, and is held relatively rigid therewith by the meshing of the sector worm gear 98 and the worm 99, the pitch of the wing 27 is transmitted through the tie rod 82, yoke 96, slide 97, to the bar 95 and to the frame 85, which is connected by means of the tie rod 86 and the lever 87 (Fig. XIX) to the mechanism of the pitch-registering scale 91. Changing the angular relationship between the arm 93 and the frame 85 does not affect the ratios of the levers and connections between the wing and the pitch-registering scale because the lever frame 85 remains substantially horizontal and the arm 93 and bar 95 remain parallel to the wing 27. What little change in the center of gravity of the wing and of the lever 83 takes place is compensated for by the opposing change in the position of the weight 94.

The "pitch" lever 83 is connected directly to the wing 27, rather than to the live deck 22, to eliminate the necessity for interconnecting the "pitch" and "drag" lever systems. Similar to the operation described above, with regard to the "side drag" and "roll" lever system interconnections, the force exerted by the drag of the wing 27 would tend to tilt the live deck 22 around its transverse axis if the tie rod 82 were connected to the deck directly. This would cause registration of pitch producing force if the pitch lever system were connected directly to the live deck. However, by having the direct connection between the wing 27 and the pitch lever 83, the effect of the rotation of the deck 22 about its transverse axis does not influence the registration of the force causing the wing to pitch.

To permit "back-weighting" of the various lever systems involved in this device, there is attached to the horizontal arm of each of the "drag" bell cranks 64, the horizontal arm of the "side-drag" bell crank 48, the "pitch" lever 83 and the lever arms 38 and 71 of the resolving levers 36 and 69, a weight receiver 119. Loose weights placed upon these weight receivers "back-weight" those levers to which they are connected and permit the study of the reaction of the aircraft, or part being tested, under various fixed and predetermined negative loads. The load pivots of the levers 24 are two-edged to afford a pivoting surface for the levers 24 under both positive and negative movements of the levers.

Because the live deck 22 shifts and rocks under the forces to which it is subjected, and which are to be transmitted through the lever systems to the various force indicating scales, those portions of the lever systems which are connected to the deck 22 must be connected thereto by means of flexible universal connections. For this reason, the lower ends of the support rods 23 (Figures VIII and IX) have flexible two-directional brackets 120 connecting them to the deck 22. Similarly, the upper ends of the rods 23 are attached to yokes 120', by means of flexible connections, and the load pivots on the levers 24 are held in the yokes 120' by means of resilient rods 121.

For these same two reasons, the fulcrum pivots of the levers 24, which are mounted in the brackets 25, are two-edged and are held in place by resiliently attached rods 122 (Figure VII).

The horizontally disposed anchor rods 46 and 62 of the "side-drag" and "drag" lever systems (Figures X and XI) are attached to the live deck 22 by means of ball bearing swiveled universal joints 47 and 63 respectively and are attached to the lower ends of the bell cranks 48 and 64 respectively by similar universal joints 123 (Figure XI). In these joints the forked ends of the brackets, bell cranks, or rods, are at 90° from each other and each of the forks is pivoted in a ball bearing permitting angular movement of the two connected parts relative to each other. This is necessary since the live deck 22 may be rotated on its vertical axis (in other words. may "yaw") which causes relative horizontal angular movement between the vertical arms of the bell cranks, which are fulcrumed in brackets 49 and 65 attached to fixed frames 50 and 66 respectively fastened to the turntable 14 and the anchor rods 46 and 62. The pivotal connection for a change in vertical angular relationship is necessary because of the tipping of the live deck 22 and the action of the bell cranks 48 and 64.

The resolving levers 30 and 69 also pivot in two directions. This is required by their swiveling on the longitudinal axes of their pipe-like bodies, caused by "roll" and "yaw," and the angular swing of the levers 30 and 69 themselves in their brackets 37 and 70 respectively, caused by "lift" and "drag." Therefore, the end of the lever 30 is pivoted in the bracket 37 (Figures XVI, XVII and XVIII) in the bearing 39 for swiveling on the axis of the pipe-like body 36 and in bearings 124 for angular movement of the body. The lever 69 is similarly mounted in the bracket 70.

However, ball bearings, rather than two-edged pivots, are used in these universal joints and pivotal positions because it is necessary not only to provide for two-directional pivoting in the same plane but also to give a greater flexibility to the universal connections than could be achieved with pivotal elements.

When weights are placed on the receivers 119 for "back-weighting" the various lever systems to apply negative forces to the aircraft, the levers on which the weights are placed, or on which they act, must not be permitted to "ride out" of their bearings as they would if single knife edges were used.

This two-directional or universal flexibility is necessary in the lever systems just described, but is not required in the lever system for the pitch-indicating scale since it is mounted on the framework 90 attached directly to the live deck 22.

If the scale 91 were not mounted directly on the live deck 22, it would be necessary to have the lever 83 universally mounted in the stand 84. This would not be satisfactory since it is necessary to provide for relative angular displacement of the bar 95, and the frame 85, and they must be pivoted on the same axis to permit the driving and locking connection between the sector worm gear 98 and the worm 99. But, since the pitch-registering scale 91 is mounted directly on the live deck 22, the necessity for such universal mounting is eliminated. The universal connection 102 is placed between the shafts 100 and 101 to permit the angular displacement of the lever 83, because of the pitch of the wing 27, with regard to the angle of attack indicating mechanism located in the housing 106 which is mounted on the turntable 14 and also to allow for the shifting and rocking of the live deck 22.

The embodiment of the invention that has been disclosed may be modified to meet various requirements.

Having described the invention, I claim:

1. In a device for testing the forces affecting an aircraft in flight, in combination, load-counterbalancing and indicating mechanisms and a lever system operatively connecting such aircraft to said load-counterbalancing and indicating mechanisms, said lever system including a resolving lever mounted to rock on the longitudinal axis of its body and to pivot at one of its ends, said resolving lever being operatively connected to said aircraft so that the total force exerted in one direction by said aircraft pivots said lever about its end and variations in such force caused by rotation of said aircraft on an axis perpendicular to the plane of movement of the points of connection between said lever system and said aircraft rocks said resolving lever on the longitudinal axis of its body and linkage connecting said resolving lever to at least two of said load-counterbalancing and indicating mechanisms whereby such rocking of said resolving lever actuates one of said mechanisms and such pivoting of said resolving lever actuates another of said mechanisms.

2. In a device for testing the forces affecting an aircraft in flight, in combination, load-counterbalancing and indicating mechanisms and a lever system operatively connecting such aircraft to said load-counterbalancing and indicating mechanisms, said lever system including a resolving lever mounted to rock on one of its axes and to pivot on another of its axes at right angles to the first mentioned axis, said resolving lever being operatively connected in said lever system between said aircraft and said load-counterbalancing and indicating mechanisms whereby the total force exerted in one direction by said aircraft pivots said lever about the second of said axes and variations in such force caused by rotation of said aircraft on an axis perpendicular to the plane of movement of the points of connection between said lever system and said aircraft rocks said resolving lever on the first mentioned axis and linkage connecting said resolving lever to at least two of said load-counterbalancing and indicating mechanisms whereby such rocking of said resolving lever actuates one of said mechanisms and such pivoting of said resolving lever actuates another of said mechanisms.

3. In an aircraft testing device, a lever system including a lever rockable about one of its axes and capable of pivoting about an axis at right angles to the first mentioned axis, aircraft supporting means responsive to the forces exerted by said aircraft, said supporting means being operatively connected to said lever from both sides of the longitudinal axis of such aircraft so that movement of the connecting points of said supporting means and such aircraft in the same direction pivots said lever about the second of said axes and movement of such connecting points in opposite directions rocks said lever about the first mentioned axis, and separate load-counterbalancing and indicating mechanisms responsive to each of such movements of such aircraft.

4. In a device of the class described, in combination, aircraft supporting means, load-counterbalancing and indicating mechanisms for registering the forces acting on said aircraft in each of three directions of movement and around each of three principal axes of revolution of such aircraft, and a lever system connecting said aircraft supporting means to said load-counterbalancing and indicating mechanisms, said lever system including a resolving lever capable of pivoting about one axis for transmitting the forces exerted on such aircraft in one direction to one of said load-counterbalancing and indicating mechanisms corresponding to such force and rockable about another axis at right angles to the first mentioned axis for transmitting the forces exerted on one side of said aircraft in the same direction as such first mentioned forces to another one of said load-counterbalancing and indicating mechanisms.

5. In a device of the class described, in combination, a lever system for supporting an aircraft in an airstream and for transmitting the forces acting on such aircraft to load-counterbalancing mechanisms for recording each of the forces acting on such aircraft in each of three directions independently of the forces acting on such aircraft in the other directions and for recording each of the forces tending to turn such aircraft on each of its principal axes independently of the forces tending to turn such aircraft on the others of its axes, said system including resolving levers capable of pivoting on one of their principal axes in response to forces tending to move such aircraft in one direction and rockable on another of their principal axes in response to forces tending to turn such aircraft on its axis at right angles to the plane of movement of such aircraft in such direction each of said resolving levers being operatively connected through said lever system to at least two of said load counterbalancing mechanisms each of which is responsive to a different movement of said resolving lever.

6. In a device of the class described, in combination, aircraft supporting means, a lever system connecting said supporting means to load-counterbalancing mechanisms, said lever system including resolving levers, one of said resolving levers being capable of pivoting on one of its major axes in response to force created by the resistance of such aircraft to passage through the air and rockable about another of it principal axes in response to force created by excess of resistance of one side of such aircraft to such passage over the resistance of the other side of said aircraft, to such passage, linkage responsive to such pivoting of said lever connecting said lever to one of such load-counterbalancing mechanisms, linkage responsive to such rocking of said lever connecting said lever to another of such load-counterbalancing mechanisms, another resolving lever pivotally responsive to the force exerted by the passage of such aircraft through the air and rockingly responsive to the excess of the force exerted by one side of such aircraft over such force exerted by the other side of such aircraft, linkage responsive to such pivoting movement connecting said other resolving lever to another of such load-counterbalancing mechanisms, linkage responsive to such rocking movement connecting said other resolving lever to still another of such load-counterbalancing mechanisms, levers responsive to force tending to move such aircraft horizontally at right angles to the direction of passage of such aircraft through the air, linkage connecting the last mentioned levers to the latter resolving lever for isolating various component forces combined therein, and connecting the last mentioned levers to another of such load-counterbalancing mechanisms, levers responsive to the forces tending to rotate said aircraft about its transverse axis, and linkage connecting the last mentioned levers to another one of said load-counterbalancing mechanisms, means for varying the horizontal angular relationship of such aircraft to the direction of movement of such aircraft through the air, and means for varying the vertical angular relationship of such aircraft to such direction of movement.

7. In a device of the class described, in combination, aircraft supporting members, a lever system operatively connected to said supporting members, a horizontally rotatable frame-like structure in which said lever system is suspended, and load-counterbalancing and indicating mechanisms operatively connected to said lever system, such connection between said lever system and said aircraft supporting members being flexible, said lever system including a compound lever comprising two co-axially pivoted arms, said arms being adjustable relative to each other, one of said arms being connected to such aircraft and the other of said arms being operatively connected to one of said load-counterbalancing and indicating mechanisms and means for varying the relative angular position of said two arms.

8. In a device of the class described, in combination, a lever system connecting the aircraft being tested to the force counterbalancing and indicating mechanisms, said lever system comprising levers actuated by the resistance of such aircraft to passage through the air, levers actuated by the lifting force created by such aircraft, a resolving lever operatively connected to the first mentioned levers for isolating force tending to turn such aircraft on its vertical axis, a resolving lever operatively connected to the latter levers for isolating force tending to turn such aircraft on its longitudinal axis, each of said resolving levers being operatively connected to certain of said load-counterbalancing and indicating mechanisms for registering such forces, and levers actuated by force tending to move said aircraft at right angles to the direction of its passage through the air, the last mentioned levers being operatively connected to one of said load-counterbalancing and indicating mechanisms for registering such force and to the latter resolving lever for isolating such force.

9. An aircraft testing device comprising members for supporting an aircraft, an interconnected lever system operatively connected to said supporting members, a horizontally rotatable framework in which said lever system is supported, and load-counterbalancing and indicating mechanisms operatively connected to and actuated individually by said lever system each in response to a different force acting on such aircraft and through said supporting members on said lever system, said members for supporting said aircraft, said lever system and said mechanisms being mounted to rotate in unison with said framework.

10. An aircraft testing device comprising members for supporting an aircraft, an interconnected lever system operatively connected to said supporting members, a horizontally rotatable framework in which said lever system is supported, load-counterbalancing and indicating mechanisms operatively connected to and actuated individually by said lever system each in response to a different force acting on such aircraft and through said supporting members on said lever system, said members for supporting said aircraft, said lever system and said mechanisms being mounted to rotate in unison with said framework and means for applying predetermined weights to said lever system for "back-weighting" the levers of said lever system to create negative forces corresponding to the positive forces acting on such aircraft.

11. An aircraft testing device comprising members for supporting an aircraft, an interconnected lever system operatively connected to said supporting members, a horizontally rotatably framework in which said lever system is supported, load-counterbalancing and indicating mechanisms operatively connected to and actuated individually by said lever system each in response to a different force acting on such aircraft and through said supporting members on said lever system, said members for supporting said aircraft, said lever system and said mechanisms being mounted to rotate in unison with said framework and means for applying predetermined weights to said lever system for "back-weighting" the levers of said lever system to create negative forces corresponding to the positive forces acting on such aircraft, the levers in said system being pivoted two-directionally for operation under both such positive and such negative forces.

12. In a device of the class described, in combination, a lever system actuated by the forces affecting an aircraft supported thereby, said lever system including a compound resolving lever capable of pivoting about one of its major axes in response to force tending to move such aircraft as a whole in one direction and rockable about another of its axes at right angles to the first-mentioned axis in proportion to the excess of such force tending to move a portion only of such aircraft in such direction over such force tending to move the balance of such aircraft in such direction and individual force counterbalancing and indicating mechanisms operatively connected to said compound resolving lever, one of said mechanisms being responsive to the pivoting of said lever and another of said mechanisms being responsive to the rocking of said lever.

HALVOR O. HEM.